(12) United States Patent
Jarvis

(10) Patent No.: US 8,608,211 B1
(45) Date of Patent: Dec. 17, 2013

(54) QUICK CONNECT AND DISCONNECT ROPE SYSTEM

(71) Applicant: Charles Dwight Jarvis, Jonesboro, GA (US)

(72) Inventor: Charles Dwight Jarvis, Jonesboro, GA (US)

(*) Notice: Subject to any disclaimer, the term of this patent is extended or adjusted under 35 U.S.C. 154(b) by 0 days.

(21) Appl. No.: 13/847,317

(22) Filed: Mar. 19, 2013

(51) Int. Cl.
*B65H 69/04* (2006.01)

(52) U.S. Cl.
USPC .......................................................... 289/1.5

(58) Field of Classification Search
USPC ....................................... 289/1.5, 2, 17, 18.1
See application file for complete search history.

(56) References Cited

U.S. PATENT DOCUMENTS

| 3,398,983 | A * | 8/1968 | Olsson | 403/167 |
| 8,454,047 | B1 * | 6/2013 | Scott | 280/507 |
| 2009/0302575 | A1 * | 12/2009 | Archer et al. | 280/507 |
| 2010/0007117 | A1 * | 1/2010 | Morris | 280/515 |

* cited by examiner

*Primary Examiner* — Shaun R Hurley
(74) *Attorney, Agent, or Firm* — Charlena Thorpe, Esq.; The Law Office of Charlena Thorpe, Inc.

(57) ABSTRACT

Implementations of a quick connect and disconnect (QCD) system for connecting and disconnecting a load via a rope to a pulling force include a primary load bar connected to a first rail and a second rail and a compression pin assembly to be inserted between the first rail and the second rail. The rails may be in a variety of configurations to accommodate different hitching systems for a pulling force. The rope, the primary load bar, and the compression pin are used to form a knot that may be tied and untied relatively quickly. One end of a QCD system can be attached to a pulling force and one leg of the knot formed on the QCD may be connected to a load. In this way, a load can be connected to and disconnected from a pulling force relatively quickly.

7 Claims, 17 Drawing Sheets

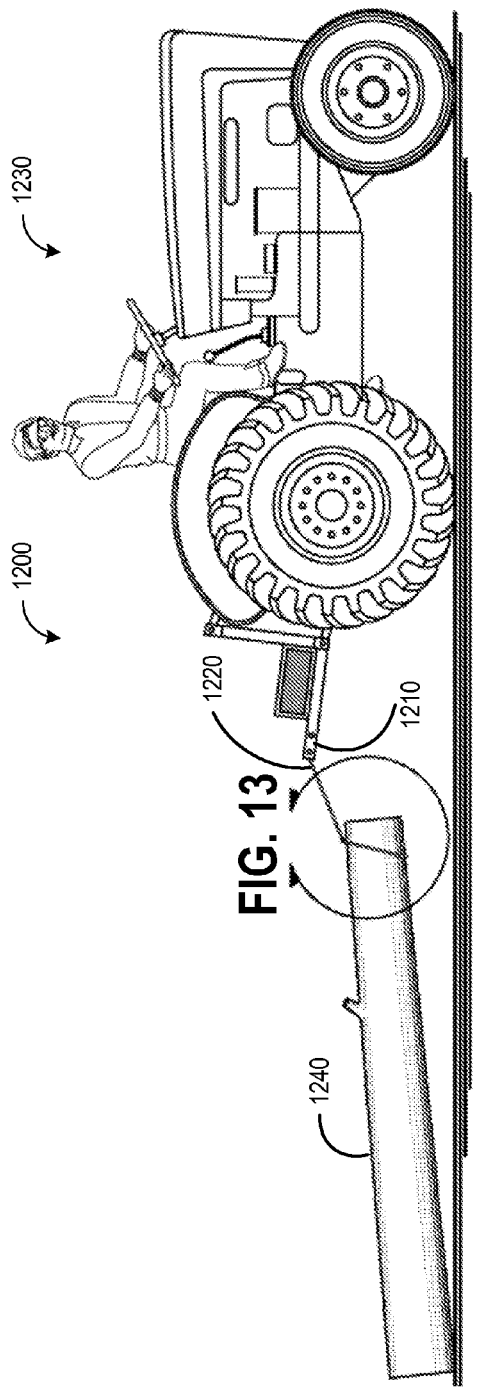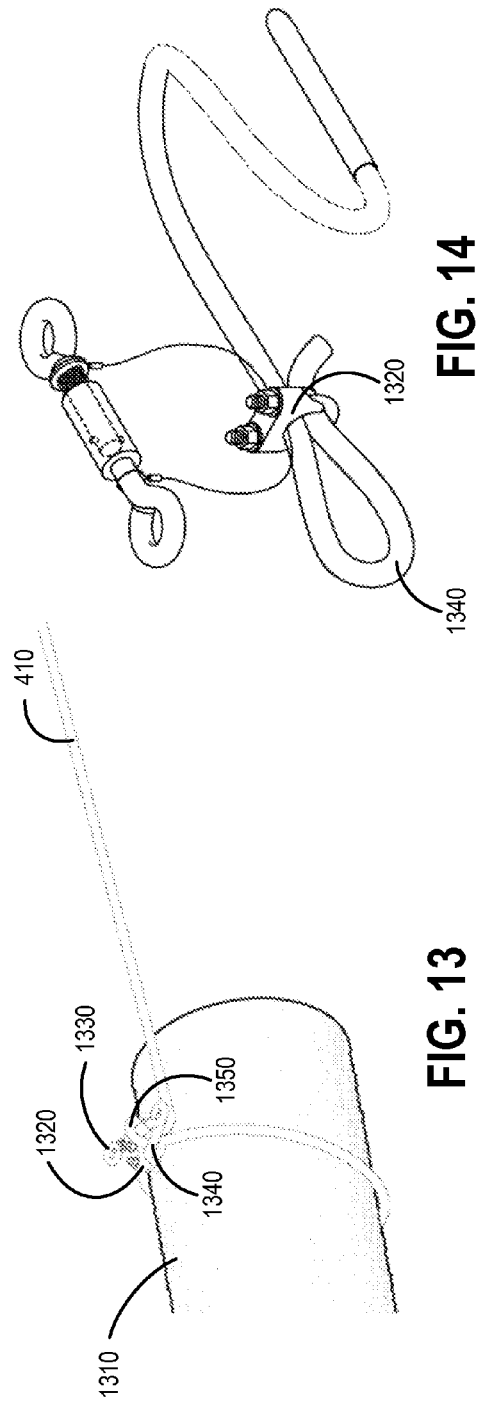

QUICK CONNECT AND DISCONNECT ROPE SYSTEM

TECHNICAL FIELD

This disclosure relates to a quick connect and disconnect rope system.

BACKGROUND

An object may be transported or secured by connecting a chain, cable, strap, or rope to the object.

However, there are disadvantages to connecting and transporting an object with a chain, cable, or strap. Chains are relatively expensive and heavy. Furthermore, the connection formed using a chain can be unreliable. Still further, the practical length of a chain limits its use for transporting an object.

Although cables can be less expensive and less heavy than chains, cables are relatively stiff and may have frayed wires, thereby making cables difficult to handle by hand.

Straps are generally used with a ratcheting system. However, it is a relatively complicated, time consuming, and high strength process to connect and disconnect the straps from the ratcheting system.

A rope may be the most cost effective instrument for transporting or securing an object. Ropes are strong and can be long. However, existing rope tying techniques can be complex and time consuming.

The above problems with chains, cables, straps, and ropes may be magnified for people with physical impairments, limited strength and grip, and/or limited experience.

BRIEF DESCRIPTION OF THE DRAWINGS

FIG. 12 illustrates an example environment in which a QCD assembly according to this disclosure can be used.

FIG. 13 illustrates an example method of tying a load leg of a rope to an example load.

FIG. 14 illustrates a looped formed with a cable clamp at the end of the load leg.

DETAILED DESCRIPTION

Various implementations of this disclosure provide apparatuses and methods for quickly and reliable connecting and disconnecting a rope that may be attached to a load on one end to a pulling force on the other end. Implementations of a quick connect and disconnect (QCD) system include a primary load bar connected to a first rail and a second rail and a compression pin assembly to be inserted between the first rail and the second rail. The rails may be in a variety of configurations to accommodate different hitching systems for a pulling force. A rope, the primary load bar, and the compression pin are used to form a knot that may be tied and untied relatively quickly. One end of a QCD system can be attached to a pulling force and one leg of the knot formed on the QCD may be connected to a load. In this way, a load can be connected to and disconnected from a pulling force relatively quickly.

Figure 1A:
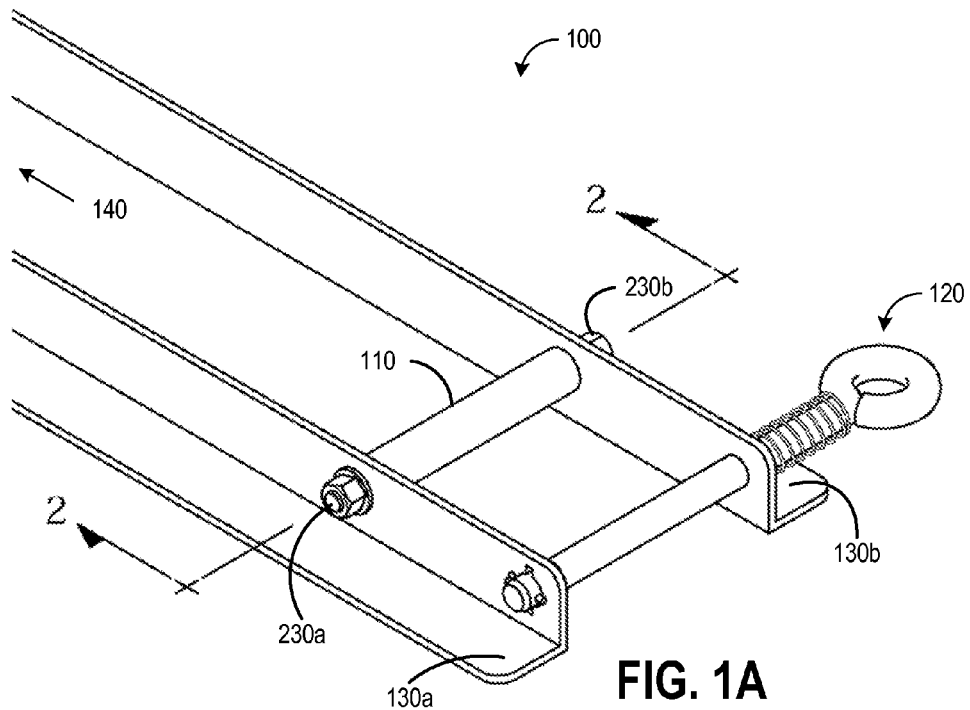
FIGS. 1A and 1B illustrate an example implementation of a quick connect and disconnect (QCD) system according to the principles of the present disclosure.
Figure 1B:
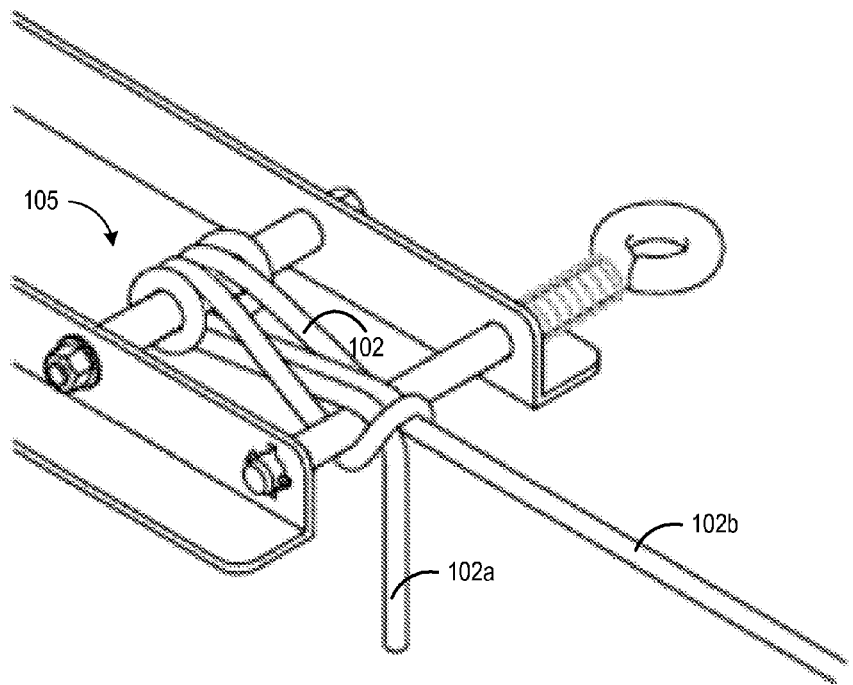

FIGS. 1A and 1B illustrate an example implementation of a quick connect and disconnect (QCD) system 100 according to the principles of the present disclosure for connecting and disconnecting a load via a rope 102 to a pulling force (not shown) such as a motor vehicle on the pulling force end 140 of the QCD system. The QCD system 100 comprises a primary load bar 110, a compression pin assembly 120, a left rail 130a, and a right rail 130b. The primary load bar 110 is connected between the left rail 130a and the right rail 130b and the compression pin assembly 120 is configured to be inserted between the left rail and the right rail.

As shown in FIG. 1B, the knot 105 formed by rope 102 (the method of forming will be discussed below) includes a first leg 102a and a second leg 102b. The second leg 102b can be attached to a load (not shown). The primary load bar 110 may be configured to withstand a load on the rope 102.

As an overall summary, FIG. 12 illustrates an example environment 1200 in which a QCD assembly 1210 according to this disclosure can be used. As shown in FIG. 12, a QCD assembly 1210 according to the principles of the present disclosure is used to connect and disconnect a rope 1220 to a pulling force 1230. The rope is attached to a load 1240.

Figure 2:
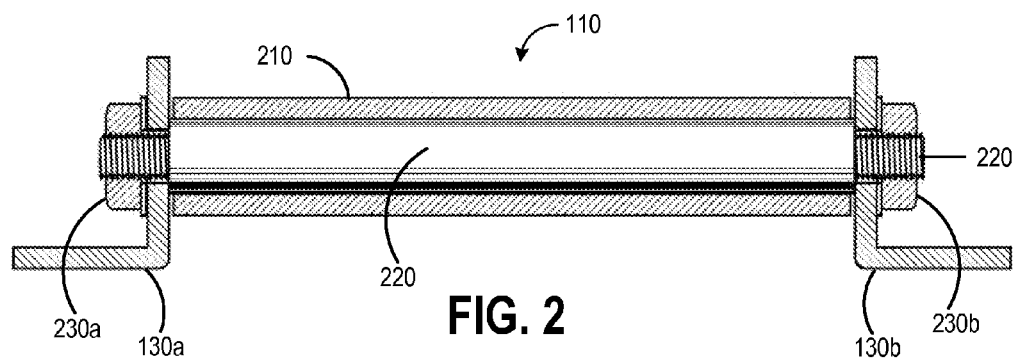
FIG. 2 illustrates an example implementation of the primary load bar of the QCD system of FIG. 1.

Returning to FIG. 1A, in some implementations, the compression pin assembly 120 operates in the same or similar manner to the compression-hitching pin 250 described in U.S. patent application Ser. No. 13/541,654 entitled "Floating Hitching System", now U.S. Pat. No. 8,360,460, (i.e., compression-hitching pin 250 of FIGS. 2, 3, and 4 of the '654 patent application), which is incorporated by reference in its entirety. In some implementations, the compression pin assembly is configured as the compression-hitching pin 250 in the '654 patent application FIG. 2 illustrates an example implementation of the primary load bar 110 of FIG. 1A. FIG. 2 is a cross-sectional view at line 2-2 of FIG. 1A. As shown in FIG. 2, in some implementations, the primary load bar 110 includes an outer tube 210, an inner tube (e.g., a dual shoulder bolt) 220, and fastening hardware 230a, 230b to connect the inner tube 220 to the rails 130a, 130b, respectively.

The outer tube 210 may be of sufficient diameter and length to spin on the inner tube 220. In some implementations, the primary load bar 110 includes standard bolts, an inner, longer tube, and an outer, shorter tube that spins around the inner tube.

Figure 3:
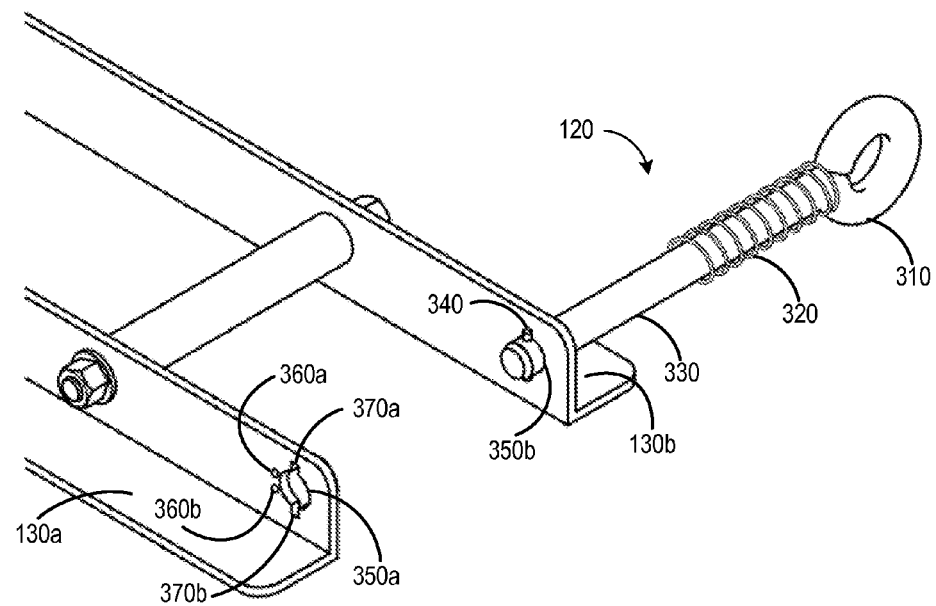
FIG. 3 illustrates an example implementation of the compression pin assembly of the QCD system of FIG. 1.

FIG. 3 illustrates an example implementation of the compression pin assembly 120 of FIG. 1. In some implementations, the compression pin assembly 120 includes an eye bolt 310, a compression spring 320, and a dowel pin 340 inserted in the shaft 330 of the compression pin assembly 120. The head of the eye bolt 310 can serve as a stop for the compression spring 320 and as a handle to manipulate the compression pin assembly 120. In some implementations, the dowel pin 340 can serve to prevent the compression pin assembly 120 from coming out of the hole 350b in the right rail 130b and as the locking key after the shaft 330 is inserted into the dual-notched hole 350a in the left rail 130a. In some implementations, protrusions 360a, 360b on the left rail 130a, along with the outward force of the compression spring 320, can serve as a locking mechanism.

Figure 6A:
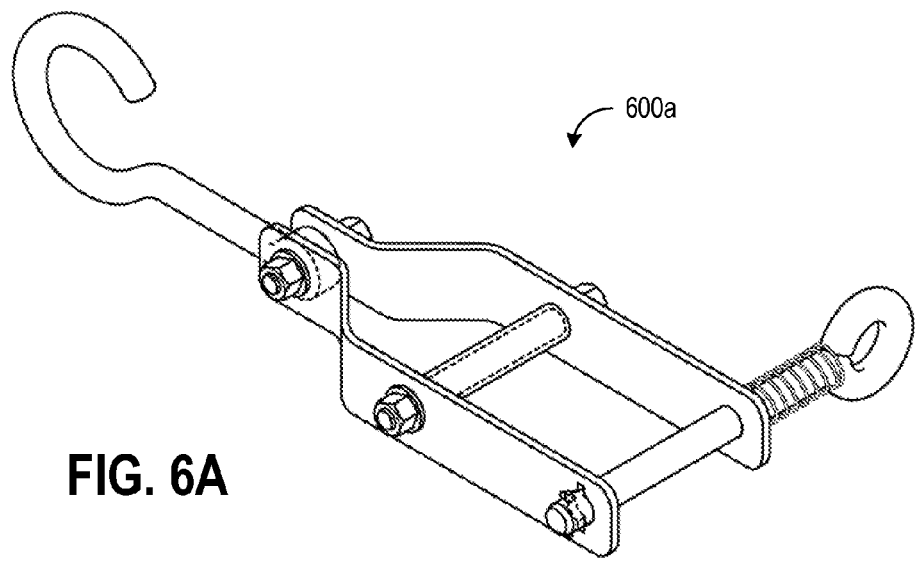
FIG. 6A through FIG. 6E illustrate example QCD systems with different rail configurations for different hitching systems.
Figure 6B:
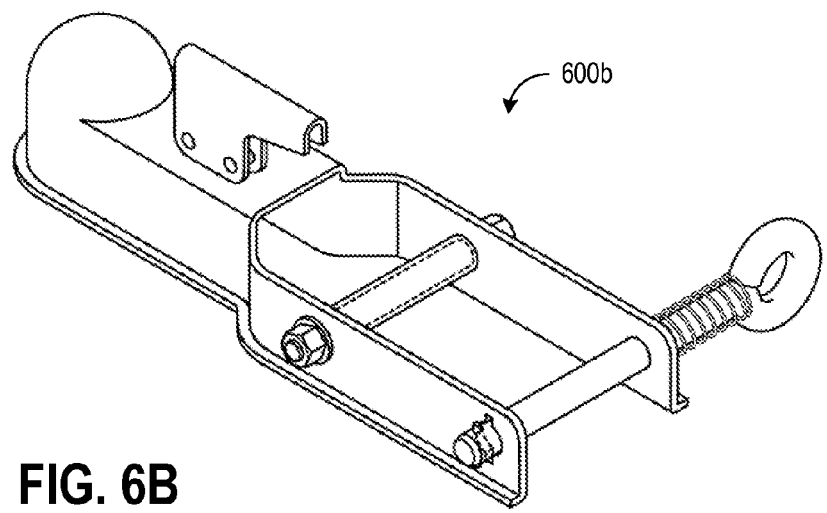
Figure 6C:
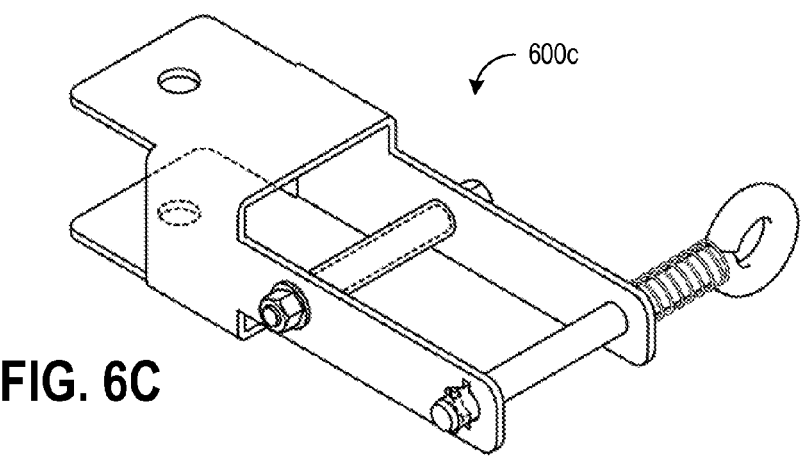
Figure 6D:
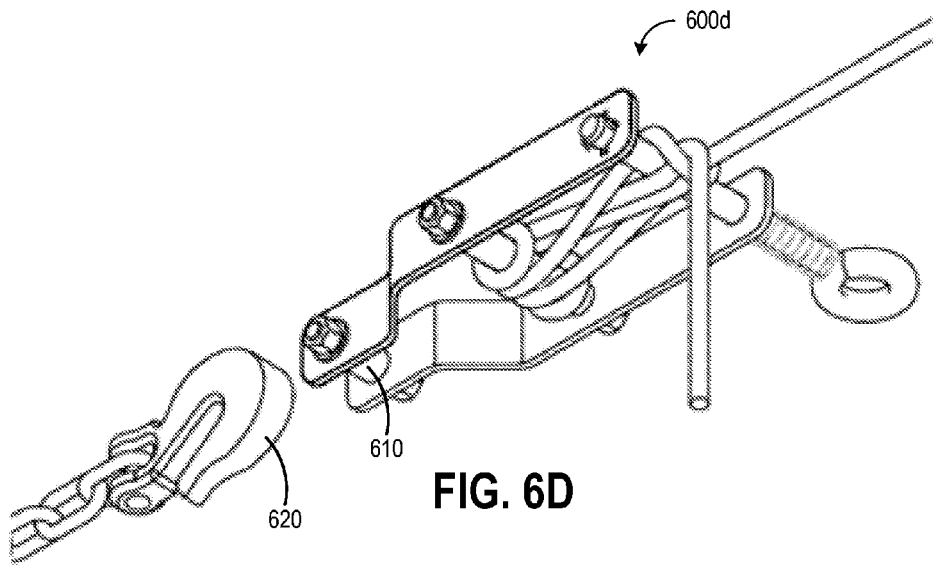
Figure 6E:
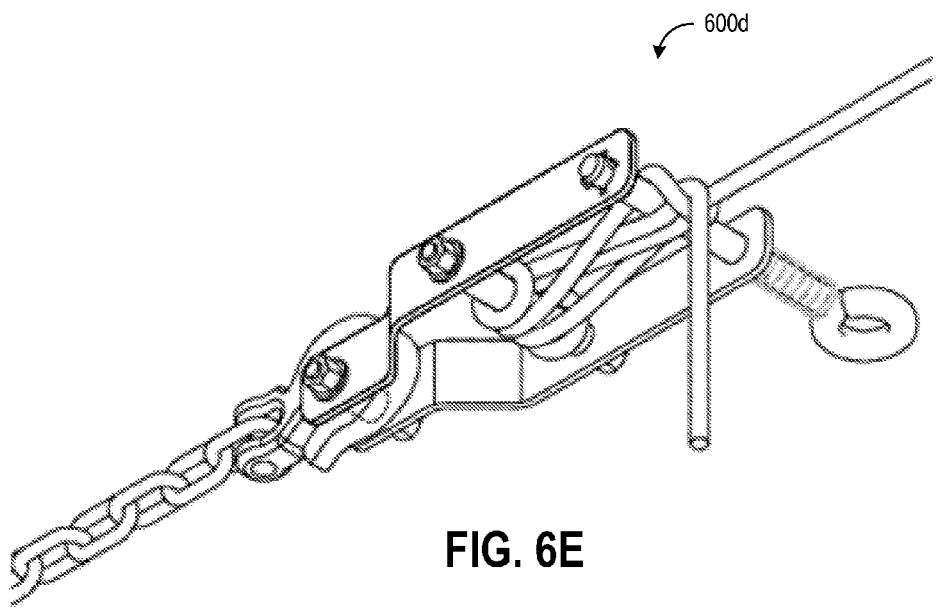

FIGS. 4A through 4F illustrate an example method for tying a quick knot (such as the knot 105 of FIG. 1B) to a QCD system 400. The QCD system 400 of FIG. 4 is similar to the QCD system 100 of FIG. 1A. Both systems include a primary load bar connected to a left rail and a right rail and a compression pin assembly to be inserted between the left rail and the right rail. The primary load bar and compression pin assembly are the same in both systems while the rails are different. As will become evident, the principles of the present disclosure apply to a variety of QCD systems including a primary load bar connected to a left rail and a right rail and a compression pin assembly to be inserted between the left rail and the right rail where the rails may be in a variety of configurations to accommodate different hitching systems for a pulling force. For example, FIG. 6A through FIG. 6E illustrates example QCD systems with different rail configurations for different hitching systems. FIG. 6A illustrates a QCD system 600a configured for a hook-type hitching system. QCD system 600a may be used to hitch a load to a truck bed. FIG. 6B illustrates a QCD system 600b configured for a standard ball and socket trailer hitch system. FIG. 6C illustrates a QCD system 600c configured for a standard "U" tongue trailer hitch system to hitch a load to the tow bar of a motor vehicle. FIGS. 6D and 6E illustrate a QCD system 600d configured to convert from a rope to other mediums, such as a strap, a cable or a chain. The pulling force end of the QCD rails are modified to accommodate bolt 610 which allows connection to a hook 620, for example.

Figure 4A:
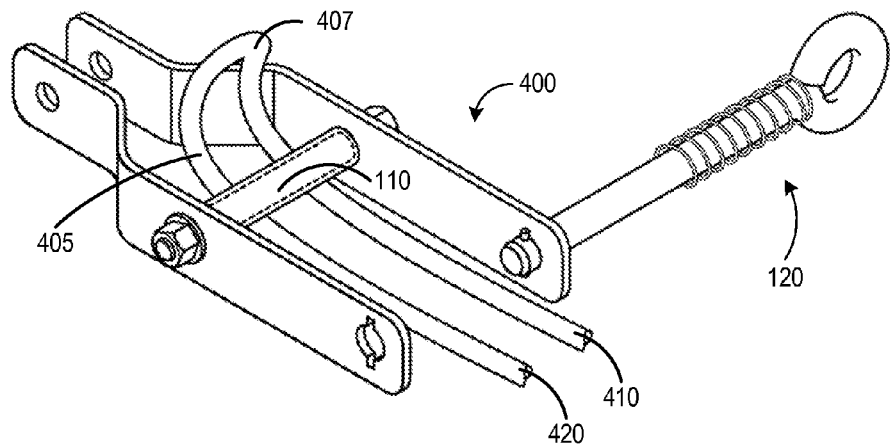
FIGS. 4A through 4F illustrate an example method for tying a quick knot to a QCD system.

Returning to FIG. 4A, to tie a quick knot to a QCD system, first, create a loop 407 at any point along a rope 405 to produce a load leg 410 and the loose leg 420. Then, bring the loop 407 under, up, and over the load bar 110 as shown in FIGS. 4A and 4B.

Figure 4B:
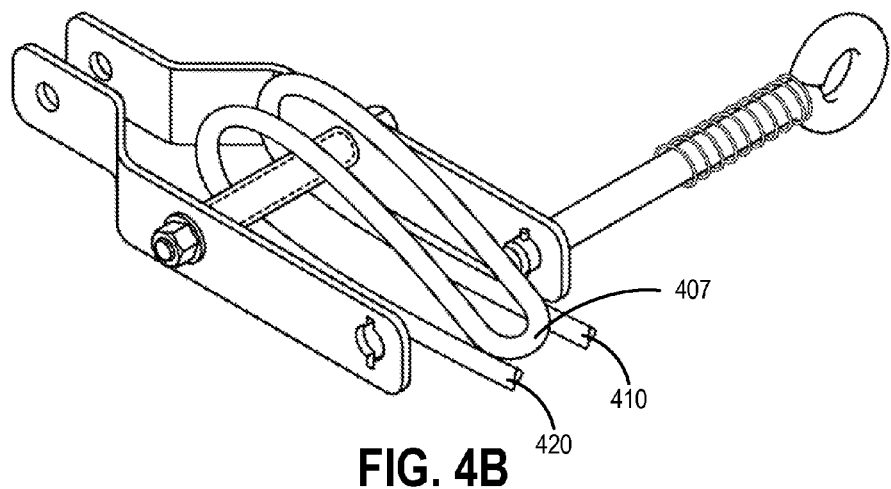

Then, bring the loop 407 between the legs 410 and 420, as illustrated in FIG. 4B.

Figure 4C:
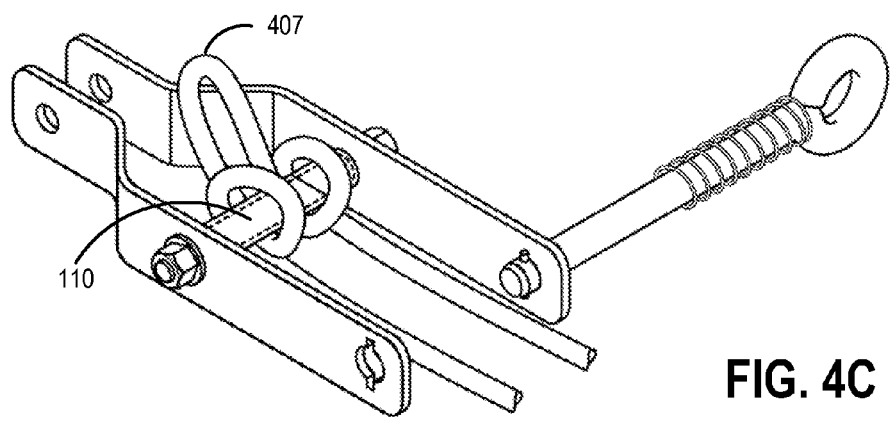

As illustrated in FIG. 4C, bring the loop 407 under, up, and over the load bar 110 again.

Figure 4D:
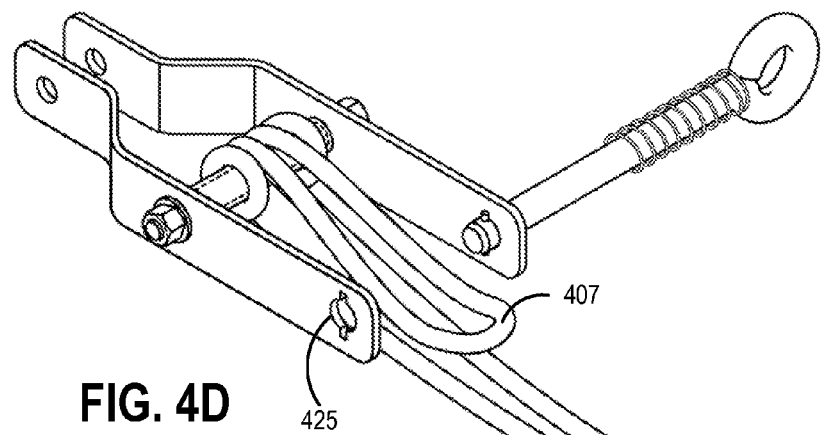

Then bring the loop 407 over the legs 410, 420 as shown in FIG. 4D.

Figure 4E:
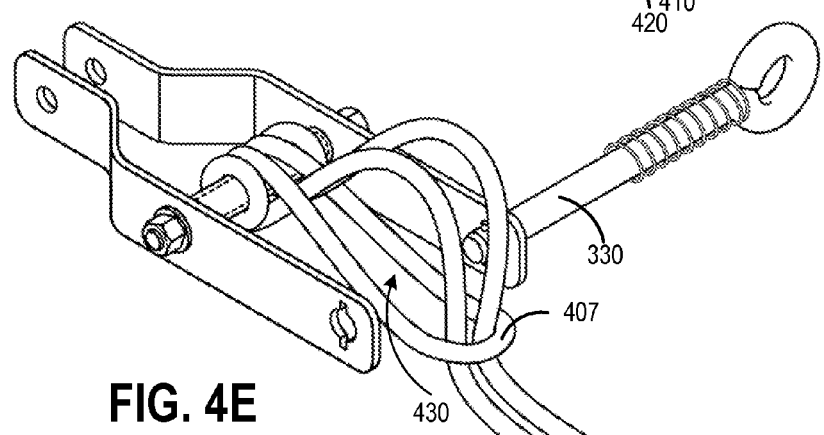
Figure 4F:
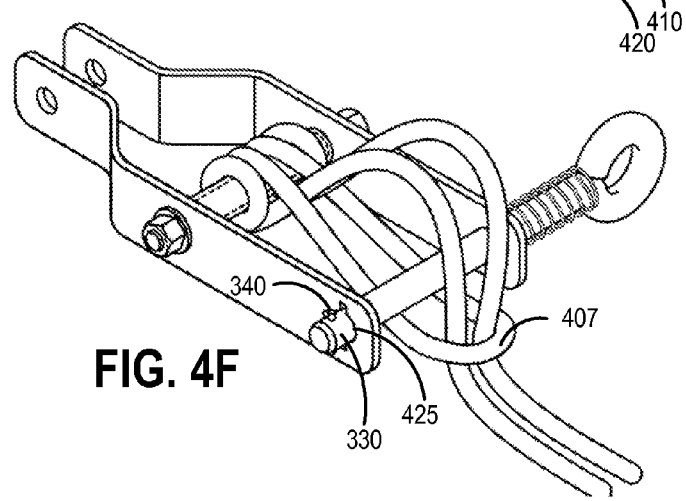

Then pull a portion of the legs 410, 420 between the loop 407 such that the ends of the legs 410, 420 hang under the loop 407 as shown in FIG. 4E. This sequence produces a tunnel 430 into which the compression pin shaft 330 is inserted, as shown in FIG. 4F. The hole 425 may be configured with slots to receive the lower portion of the shaft 330 and the dowel pin 340 of the compression pin 120 when the dowel pin 340 is in a first direction lengthwise. The compression spring 320 may be of a sufficient diameter such that the compression spring 320 is blocked by the right rail. When the bottom of the compression spring 320 rests on the right rail, the lower portion of the shaft 330 may be of a sufficient length such that the end of the shaft 330 can be received by the hole 425 of left rail. As the handle 310 of the compression pin 120 is pushed toward the left rail, the compression spring 320 may be compressed, and then the handle 310 of the compression pin 120 may be rotated to position the dowel pin 340 in a second direction lengthwise to lock the compression pin 120 in place. In some implementations, the handle 310 may be rotated 90 degrees from the first direction (that is, the first direction and the second direction are at right angles).

When the rope is tightened by mechanical cam action (e.g., the load binder of FIGS. 7 and 8), the cam action may stretch the rope a relatively short distance. Thus, to tighten the load leg 410, the rope may be pulled where it first wraps around the load bar and then the remaining slack in the rope may be worked toward the loose end.

The knot may be tightened further when a pulling force is activated. In some implementations, tying a knot according to the above method may take three to six seconds.

The load leg 410 then may be tied to a load. In some implementations, the load leg 410 may be tied to the load first before the knot is formed using a QCD. FIG. 13 illustrates an example method of tying the load leg 410 to an example load 1310 (e.g., a log). As illustrated in FIG. 13, a cable clamp 1320 and loop retainer 1330 are used to tie the load leg 410 to the load 1310. The cable clamp 1320 may be used to form a loop 1340 at the end of the load leg 410 as shown in FIG. 14. The end of the load leg may be looped around the load 1310. A loop 1350 then may be formed with the load leg and inserted into the loop 1340. The loop retainer 1330 then may be inserted into the loop 1350 to bind the rope around the load.

Figure 15A:
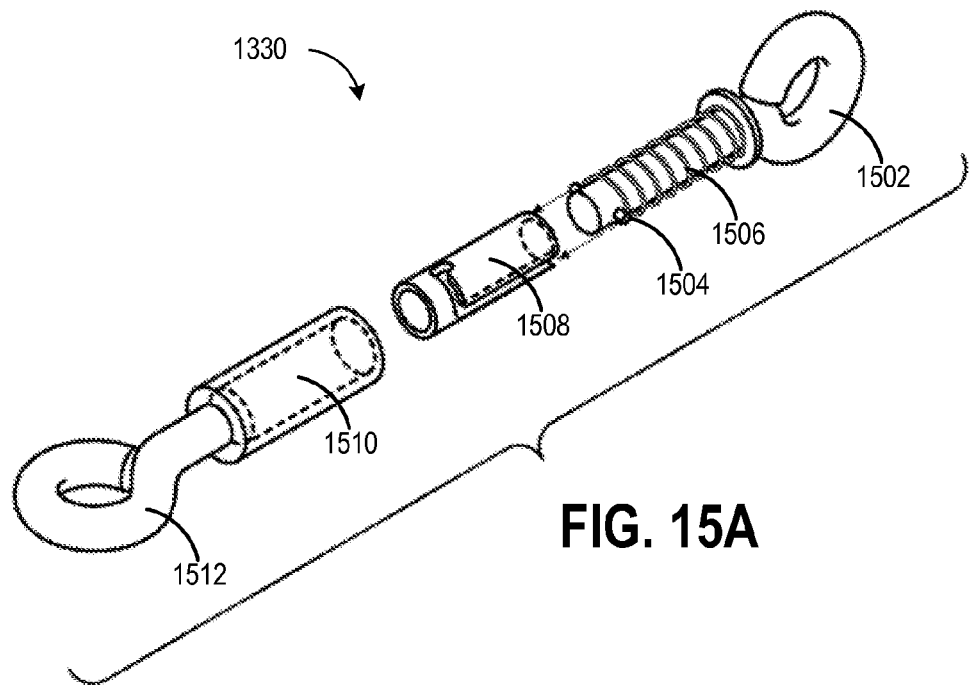
FIGS. 15A and 15B illustrate an example implementation of a loop retainer used to tie a load leg of a rope to a load.

FIG. 15A illustrates an example implementation of the loop retainer 1330. The loop retainer 1330 includes eyebolts 1502, 1512, a compression spring 1506, and a dowel pin 1504. The eyelet of eyebolt 1502 serves as a handle for the shaft of eyebolt 1502. The compression spring 1506 and the dowel pin 1504 lock the eyebolt into the double slotted inner sleeve 1508 when eyebolt 1502 is inserted into the sleeve 1508, firmly pushed, and then turned. When the eyebolt 1502 is released, the dowel pin 1504 nests into the notch in the slot which holds the spring in the compressed state and locks the loop retainer 1330.

The double slotted inner sleeve 1508 can be firmly secured into the receiving shaft 1510 during assembly. In some implementations, the double slotted inner sleeve can be eliminated and the receiving shaft 1510 can be a threaded rod connector. Eyebolt 1512 can have threads that are compatible with the receiving shaft 1510. The assembly then can be screwed together. In some implementations, the threaded rod connector can be milled so that it has the double notched slots and a smooth bore from the slots to the end for the eyebolt 1502. Since the dowel pin length may be less than the diameter of the threaded rod connector, this implementation may be employed in a similar fashion to loop retainer 1330.

In another implementations, two threaded load eyebolts are screwed into the ends of the threaded rod connector. The difference between a load eyebolt and a regular eyebolt may be that the end of the eyelet loop may be welded to the shaft. Therefore, the load eyebolt can withstand loads that would straighten out a normal eyebolt.

Figure 15B:
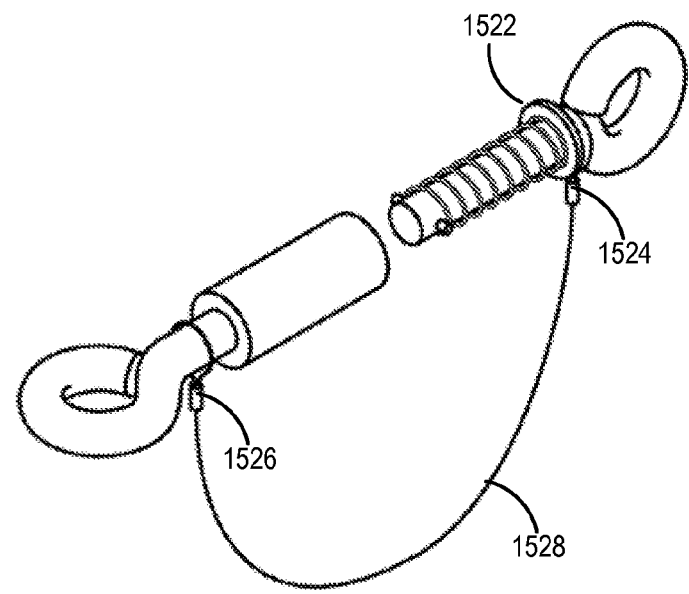

FIGS. 14 and 15B illustrate the use of a lanyard 1528 to tie the two ends of the loop binder 1330 together. Clamps 1524 and 1526 are used to secure the ends of the lanyard around the respective eyebolt. Washer 1522 may be used to prevent the lanyard from interfering with compression spring 1506. As illustrated in FIG. 14 the lanyard can be placed inside the cable clamp during assembly. This process may assure that the two ends of the loop retainer are readily available when the rope is looped around a log. Since the outside of the threaded rod connector may be a smooth hexagon tube, it may be readily inserted and, more important, removed from the loop.

Figure 5A:
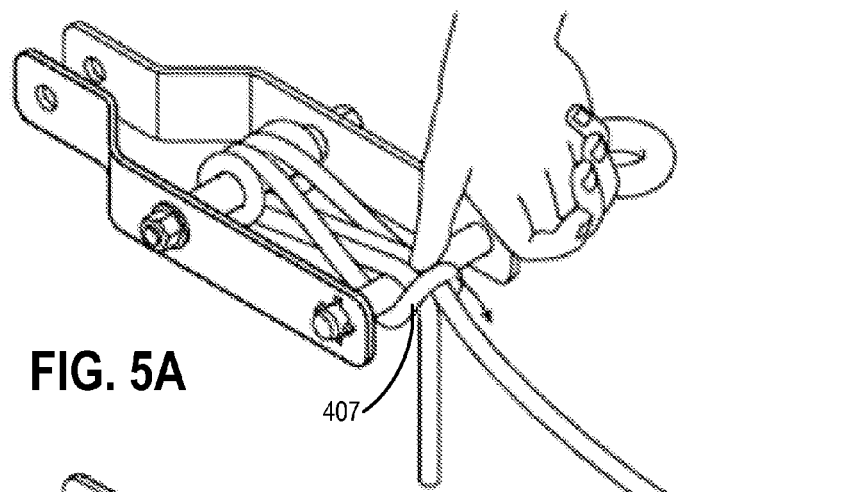
FIGS. 5A through 5C illustrate an example method for untying a quick knot from a QCD system.
Figure 5B:
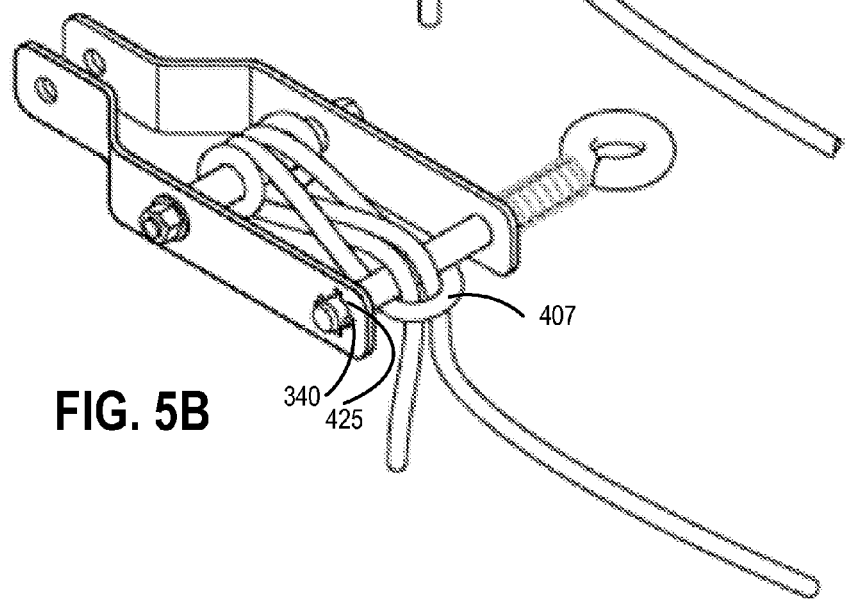
Figure 5C:
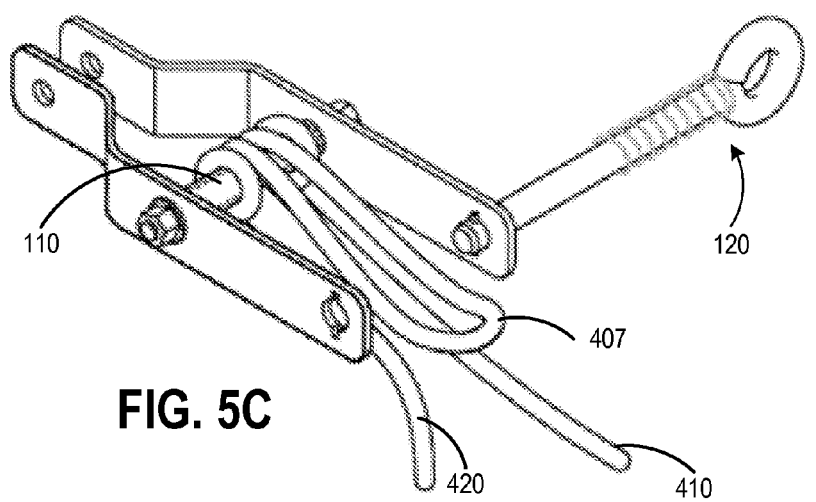

FIGS. 5A through 5C illustrate an example method for untying the quick knot from the QCD system 400. First, remove the tension on the knot by turning off the pulling force. Then, push on the loop 407, as shown in FIG. 5A, to loosen the knot, as shown in FIG. 5B.

Then unlock and remove the compression pin 120 from the left rail by pushing down and rotating the compression pin 120 to position the dowel pin 340 back in the first direction lengthwise so that the dowel pin 340 may be passed back through the hole 425.

As shown in FIG. 5C, after the compression pin 120 is removed from the hole 425 and the tunnel 430, pull the legs 410 and 420 to unwrap the loop 407 from the load bar 110. The spinning of the outer tube 210 of the load bar 110 may assist in the unwrapping of the loop 407 from the load bar 110.

In some implementations, untying the knot according to the above method may take three seconds or less.

Figure 7:
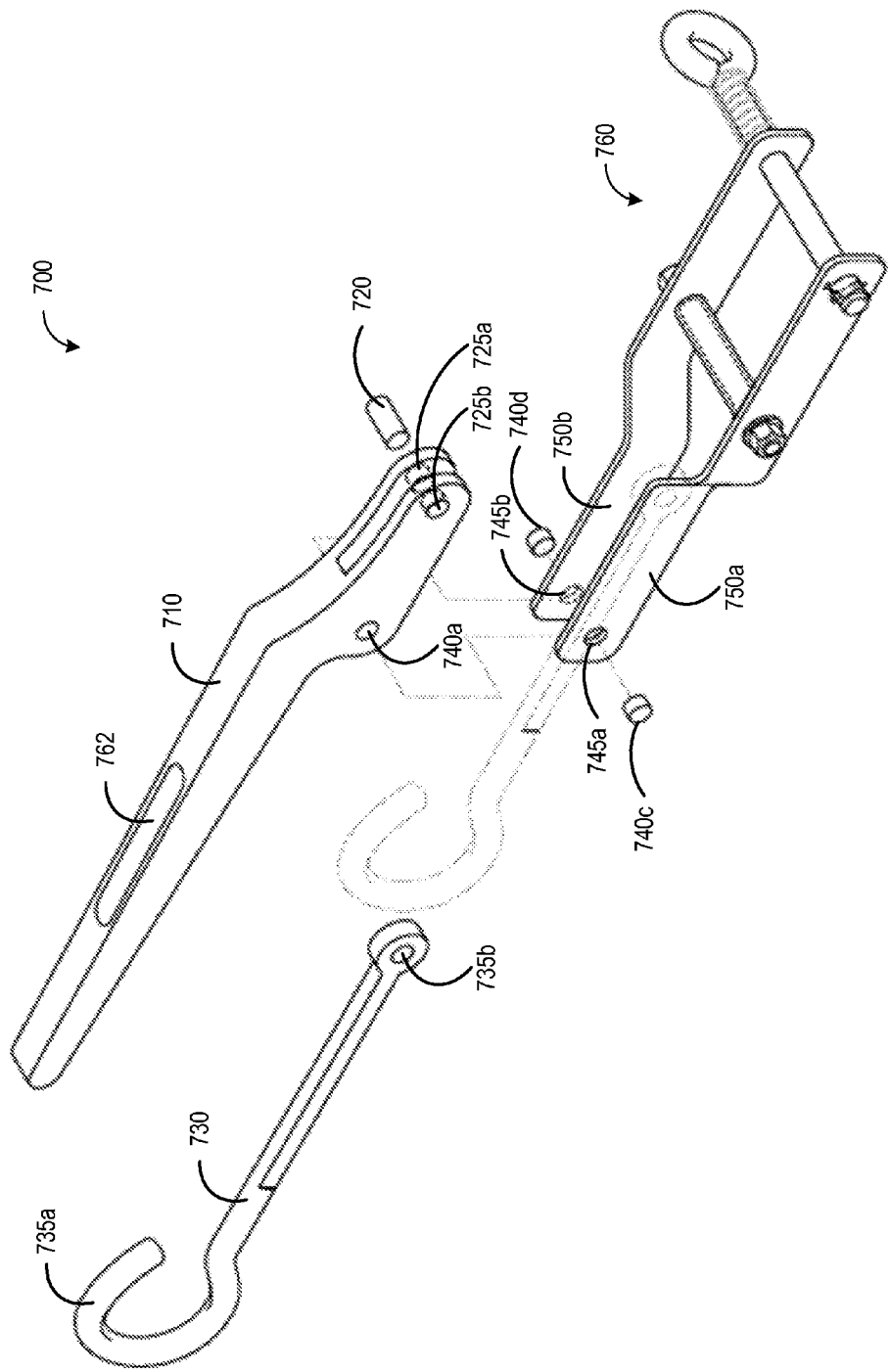
FIGS. 7 and 8 illustrate yet another example QCD system with a rail configuration for use with a load binder hitching system.
Figure 8:
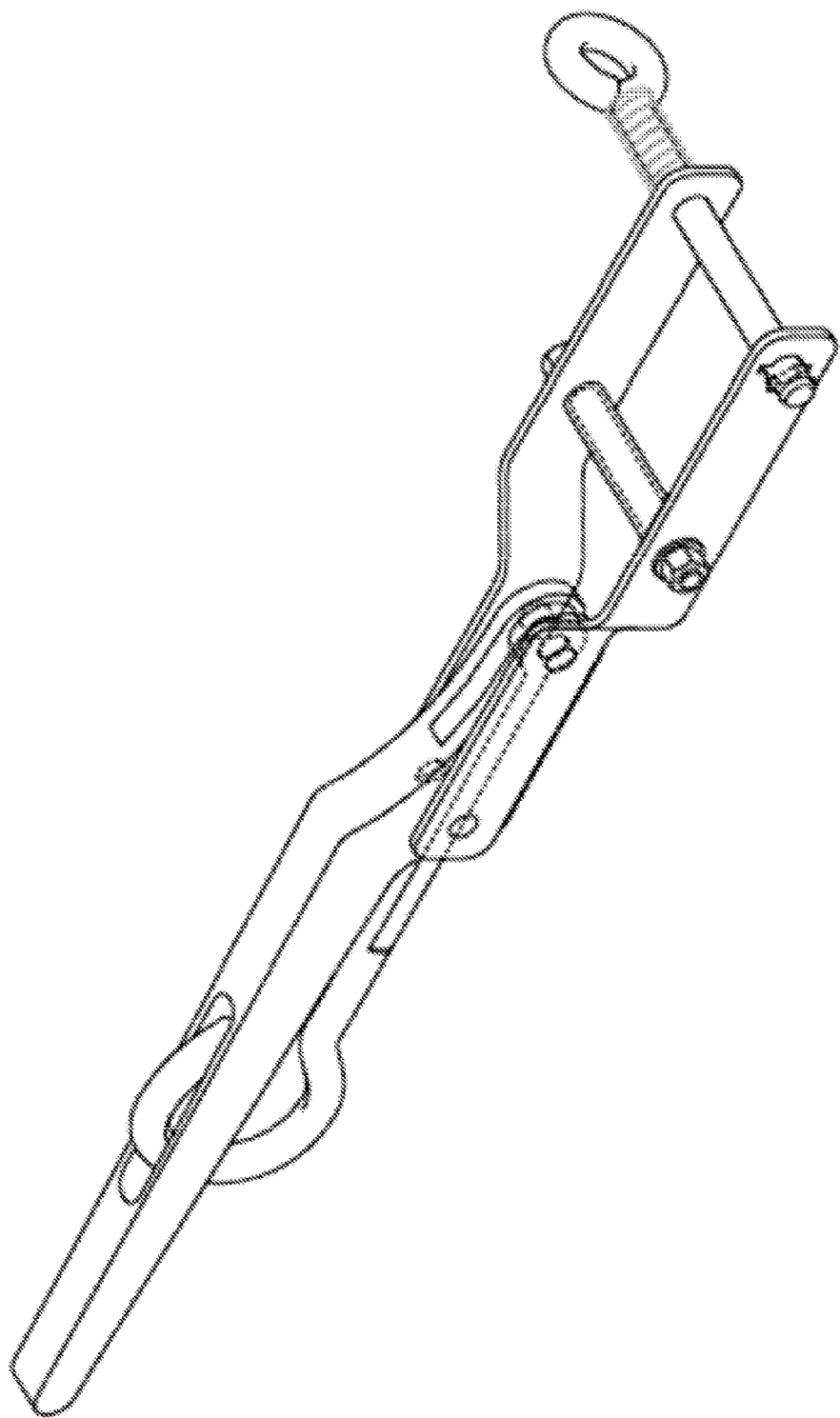

FIGS. 7 and 8 illustrate yet another example assembly 700 including an example QCD system 760 with a rail configuration for use with a load binder hitching system. The load binder includes a connecting hook 730 and lever 710 that can be connected via a pin 720 when a hole 735b of connecting hook 730 is aligned with holes 725a and 725b of the lever 710 as shown in FIG. 8. The lever 710 may include a slot 762 to provide clearance for a hook 735a of the connecting hook 730 when the load binder is in the closed position as shown in FIG. 8.

As shown in FIG. 7, rails 750a and 750b of QCD 760 are bent to connect to the pivot point 740a of the lever arm 710 using rivets 740c and 740d. The rails 750a and 750b also are configured so that the connecting hook 730 and the lever 710 assembly fits between the rails in the closed position as shown in FIG. 8. The hook 735a can connect to a fixed point, such as rails along the sides of a flat truck bed. By combining the load binder with QCD system, the load binder, which was used exclusively with chains, now can be used with ropes. The hook 735a can connect to a pulling force such as rails along the sides of a flat truck bed and the load leg of the rope can be connected to a load. Once a knot is formed using the QCD system 760 as described above, in some implementations, the rope may be stretched up to three inches when the lever 710 moves from an open position to a closed position. During closure, the connector at 735b moves past the center line of force which in turn locks the lever closed and binds the load securely. The more the load pulls on the rope, the tighter the lever arm may be clamped.

Figure 9:
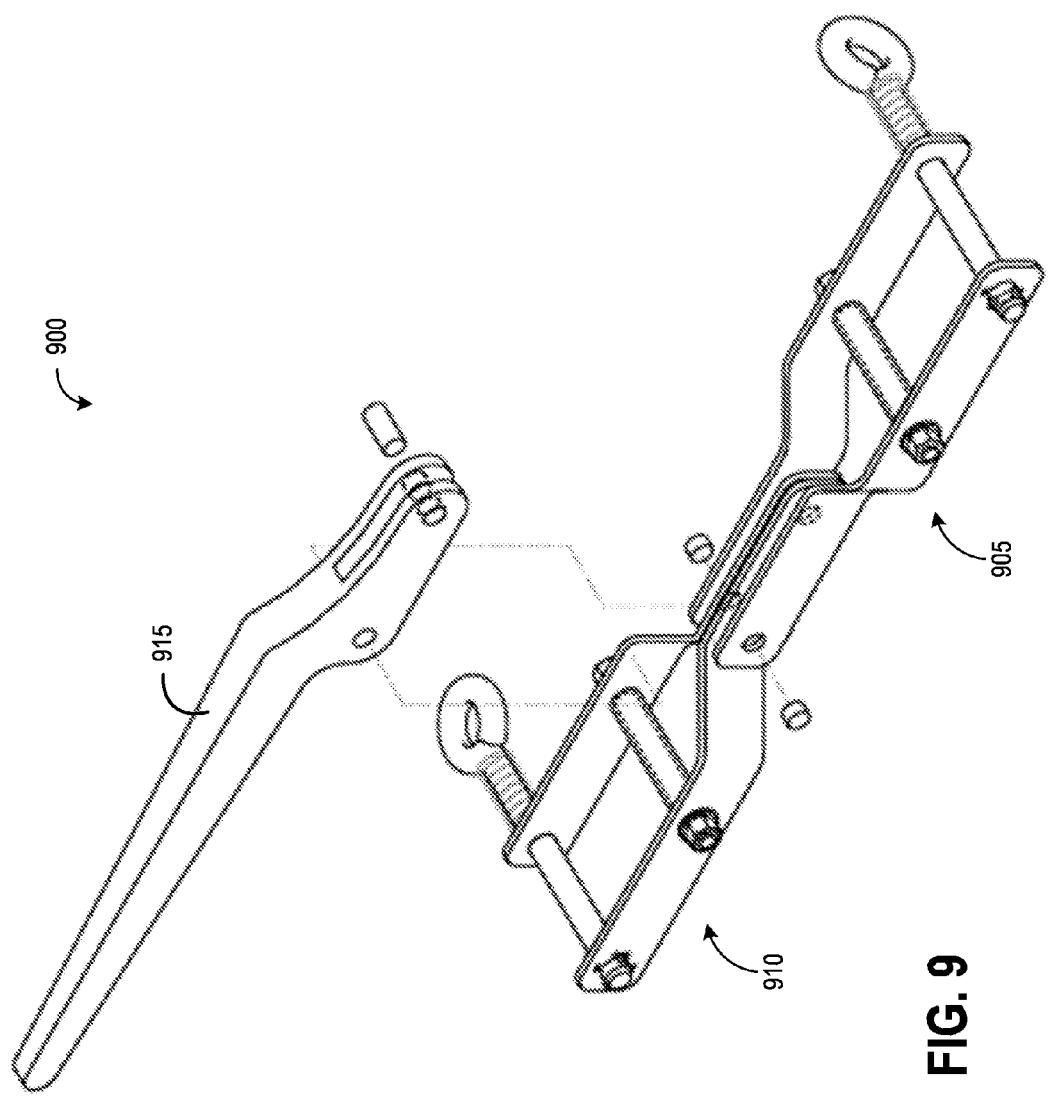
FIGS. 9-11 illustrate a dual QCD load binder assembly.
Figure 10:
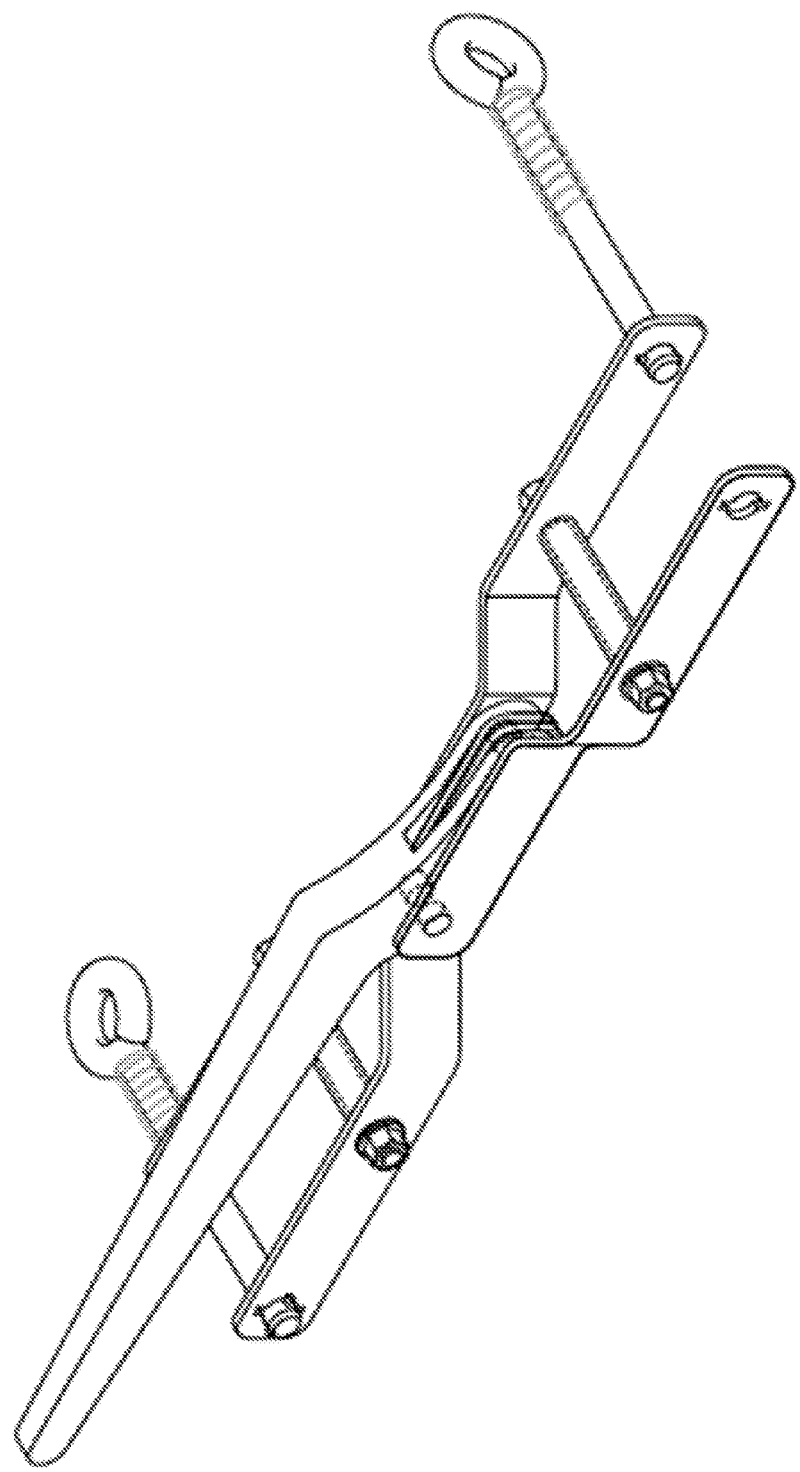
Figure 11:
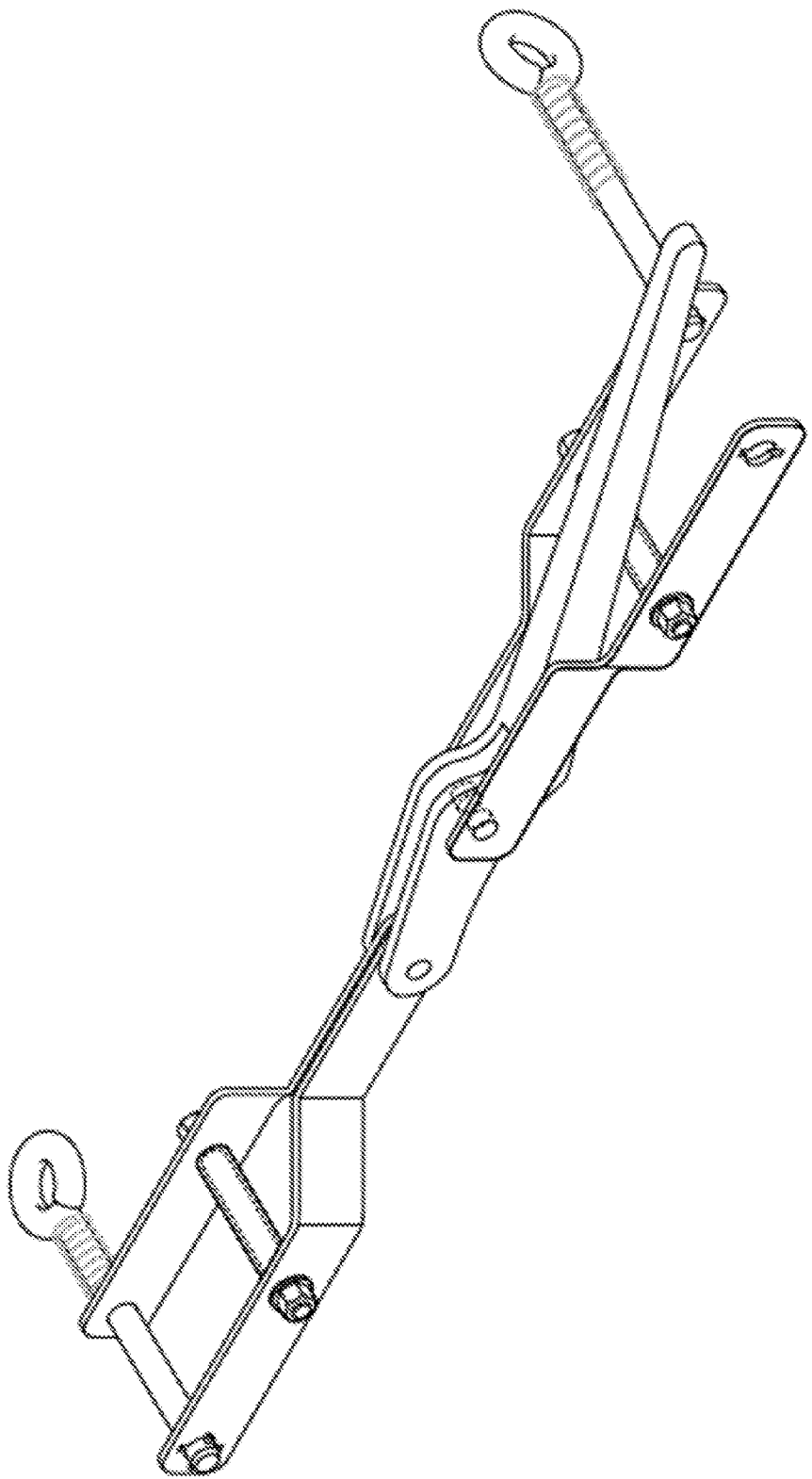

FIGS. 9-11 illustrate a dual QCD load binder assembly 900. The dual QCD load binder assembly 900 is similar to the assembly 700 of FIGS. 7 and 8, except that assembly 900 replaces the connecting hook 730 of assembly 700 with a second QCD 910. Thus, the dual QCD load binder assembly 900 includes a first QCD 905, a second QCD 910, and a lever 915.

In some implementations, the dual QCD load binder assembly 900 may be used to secure a load on a truck. For example, a knot as describe with reference to FIGS. 4A-4F may be formed using the first QCD 905 where the load leg of a rope may be connected to the load. In this implementation, the load leg of the rope can be connected to the rail of a flatbed on the back side of the load and the loose leg of the rope continues down the load and around the bed rail on the facing side of the truck. With the lever 915 in the open position (as shown in FIG. 11), the loose end of the rope can be taken up and tied snugly to the second QCD 910 as describe with reference to FIGS. 4A-4F. The dual QCD load binder assembly 900 can be closed by pulling down on the lever 915 until it goes past dead center and is locked in place. Thus the load may be securely bound to the truck. The QCD 905 may be tied up the side of the load so that the operator can apply the operator's weight when pulling down on the lever. If QCD 910 is placed up the side of the load, then the operator can push up to bind the load.

Figure 16:
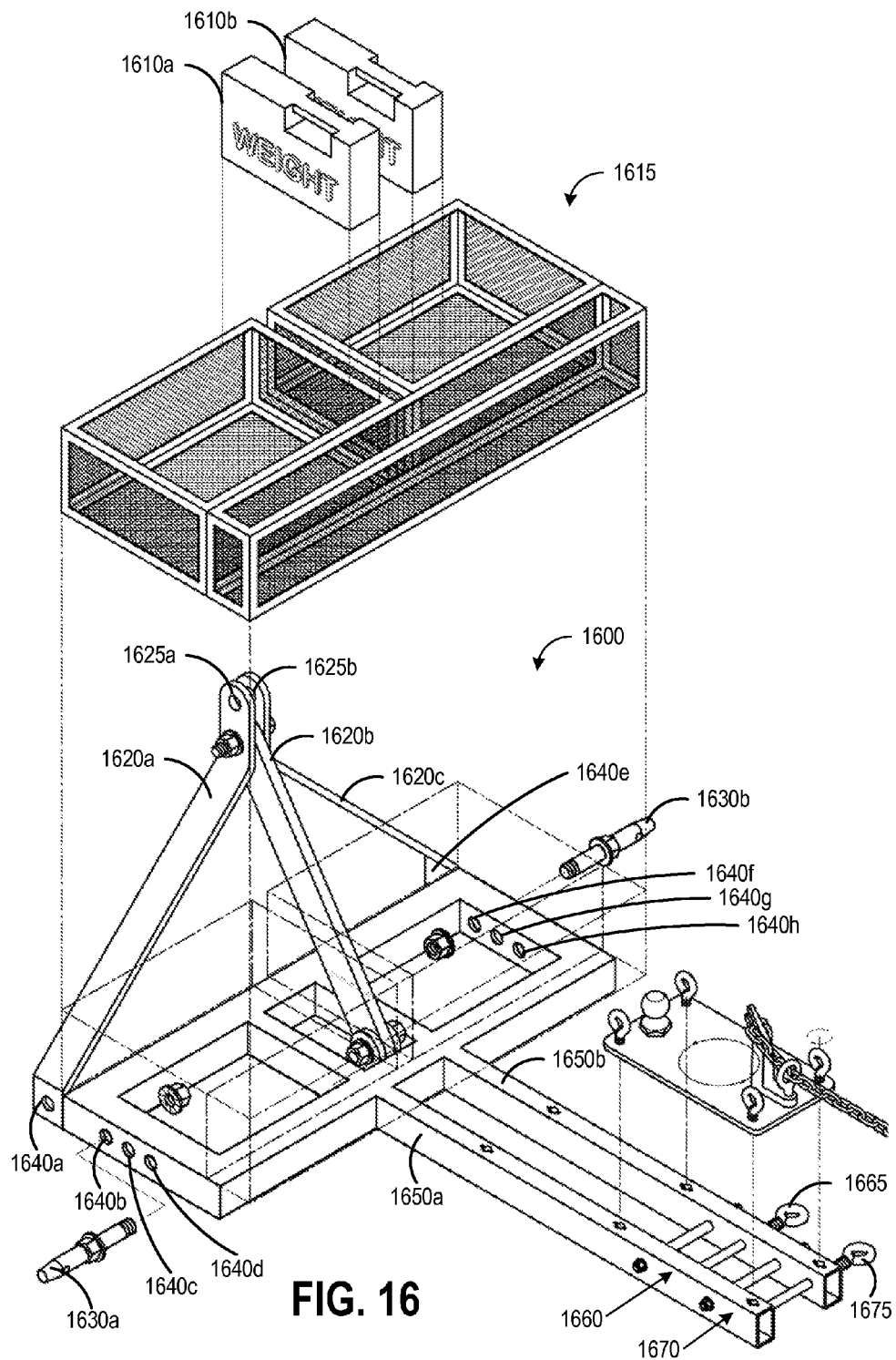
FIGS. 16-18 illustrate another example QCD assembly.
Figure 17:
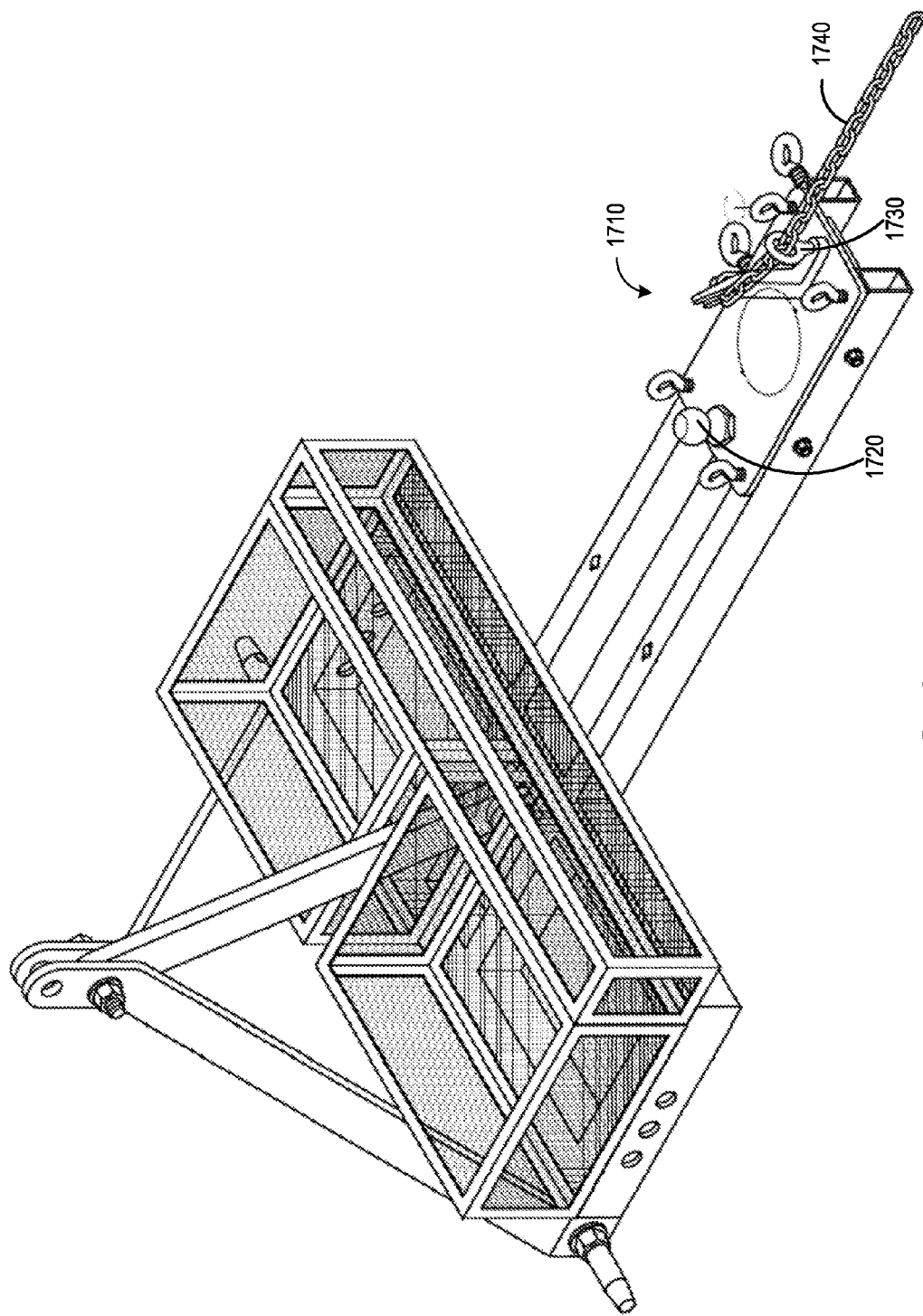
Figure 18:
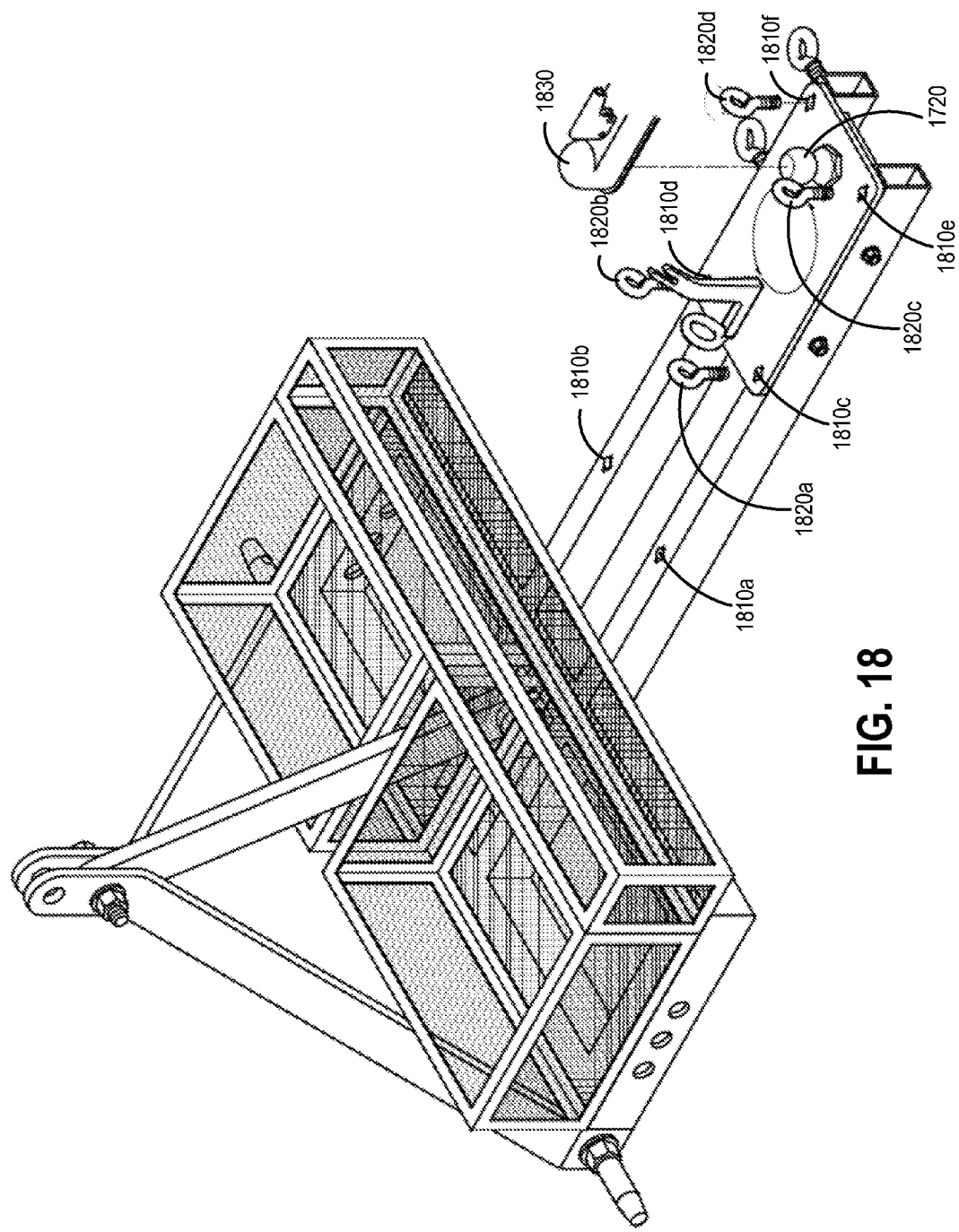

FIGS. 16-18 illustrate another example QCD assembly 1600. The QCD assembly 1600 can be used to drag a log, brush, poles, etc behind a tractor with a three-point-hitch lift capability as shown, for example, in FIG. 12. The lifting of the front end of the log may prevent abrasion of the rope. Lifting the front of the log also may reduce friction between the log and the ground. It also may avoid the front end of the log hitting the ground, a root or a stump and placing additional loads on the tractor.

In some implementations, the QCD assembly 1600 includes a basket assembly 1615. Weights 1610a and 1610b may be placed in the baskets next to brace 1620b. Placing the weights just behind the rear wheels (as shown in FIG. 12) and adjacent or inside the lift arms puts more weight on the rear tires and provides greater traction. Placing additional weight on the front wheels (e.g., when placing heavy sticks in the front bucket of the tractor loader) helps in steering and in pulling for four wheel driven tractors by forcing the front wheels down on the ground. The weights also provide a counter balance for loads that may be in the front bucket.

The basket assembly 1615 can be used to provide storage for different size and different length ropes that may be used for towing different items (logs, brush, poles, etc.) The long basket placed in the front of 1615 may be used to hold longer ropes and tools. The location of the basket may make the ropes and tools used readily available to the operator.

The A frame assembly (bars 1620a, 1620b and 1620c) provides connection to the upper arm on a tractor (e.g., a turnbuckle with an eyebolt on the end). In some implementations, the frame assembly is connected to a pulling force that is inserted between and pinned to holes 1625a and 1625b. The upper arm on the tractor can be lengthened or shortened (e.g., by turning the outer shaft of a turnbuckle). The length of the arm can control the pitch of the tubes 1650a and 1650b. Thus, in some implementations, the upper arm can be used to control the height that a load (e.g., a log) is lifted by either QCD 1660 or 1670. Two QCD's can be used to pickup two moderate size logs at two different places. As shown in FIG. 16, compression pins 1665 and 1675 are inserted into the inner side of tube 1650a. This reduces the probability that something may catch on the dowel pin, turn the compression pin and lose the log.

The other two attachment points may be eyebolts that are pushed on and pinned to prongs 1630a and 1630b. The two eyebolts can be attached to two bars that are attached to the lifting arms of the tractor's three-point-hitch lift. The eyebolts can pivot on the prongs and do so as the implement is raised or lowered or as the upper arm's length is adjusted. By bolting the prongs 1630a and 1630b into the respective hole pairs of either 1640a & 1640e (not shown), 1640b & 1640f, 1640c & 1640g, or 1640d & 1640h, the implement pitch and distance of the weights from the back of the tractor are further adjusted.

FIG. 17 illustrates an example implementation of a hitch adapter 1710 that can be placed over the two QCD's 1660, 1670 of FIG. 16 and provide a chain hitch 1730 for chain 1740. The shape of chain hitch 1730 and the weight of the chain 1740 may reduce the probability that the chain link in the jaws of the hitch will slip out when the chain is slack.

By rotating the hitch adapter 1710 180 degrees as shown in FIG. 18, the ball 1720 is rotated to the end of the implement and can be used to connect to the socket 1830. By removing the nut connecting the ball 1720 to the adapter 1710, the ball connector 1720 can be stored in the basket and other connector types, such as a hook or an eyebolt, can be attached to the hitch adapter 1710 and used.

FIG. 18 further illustrates how compression pins 1820a, 1820b, 1820c and 1820d can be inserted and locked into the respective, notched holes 1810c, 1810d, 1810e and 1810f to attach the adapter 1710 to the rectangular tubes 1650*a* and 1650*b*. By shifting the adapter to notched holes 1810*a*, 1810*b*, 1810*c* and 1810*d*, the adapter 1710 can be shifted into storage and the QCD's 1660 and 1670 are exposed and can be used.

Reference throughout this specification to "an embodiment" or "implementation" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

The invention claimed is:

1. A quick connect and disconnect (QCD) system for connecting/disconnecting a load via a rope to/from a pulling force comprising:
   a first rail having a first hole;
   a second rail having a second hole;
   a primary load bar connected between the first and second rails; and
   a compression pin assembly wherein the compression pin assembly includes a handle; a shaft; a dowel pin inserted through the shaft at a first location wherein the ends of the first pin extend from the shaft; and a compression spring located around the shaft between the first pin and the handle,
   wherein the first hole of the first rail and the second hole of the second rail are configured to receive the shaft of the compression pin and wherein the compression spring is of a sufficient diameter so that the first rail blocks the compression spring from being inserted into the first hole.

2. The QCD system of claim 1 wherein the primary load bar comprises an outer tube and an inner tube wherein the inner tube attaches to the first and second rails and the outer tube is configured to spin around the inner tube.

3. The QCD system of claim 1 wherein the second hole of the second rail includes a slot to receive the shaft and the dowel pin of the compression pin when the pin is in a first direction lengthwise.

4. A method of tying a knot using the QCD system of claim 1 comprising:
   folding a rope at any point along the rope to create a loop, a first rope leg, and a second rope leg;
   then bringing the loop under, up, and over the primary load bar;
   then bringing the loop between the first rope leg and the second rope leg;
   then bringing the loop under, up, and over the primary load bar again;
   then bringing the loop over the first rope leg and the second rope leg;
   then pulling a portion of the first rope leg and the second rope leg between the loop such that the ends of the first rope leg and the second rope leg hang under the loop;
   inserting the compression pin shaft through a tunnel produced by pulling a portion of the first rope leg and the second rope leg between the loop;
   inserting the compression pin through the second hole of the second rail while the pin is in the first direction lengthwise; and
   rotating the compression pin to position the dowel pin in a second direction lengthwise to lock the compression pin to the second rail.

5. The method of claim 4, further comprising untying steps comprising:
   removing the compression pin from the second rail by rotating the compression pin to position the dowel pin back in the first direction lengthwise so that the dowel pin may be passed back through the second hole;
   removing the compression pin from the tunnel; and
   pulling the first rope leg and the second rope leg to unwrap the loop from the primary load bar.

6. A method of tying a knot using a quick connect and disconnect (QCD) system wherein the QCD system comprises a first rail; a second rail; and a primary load bar connected between the first and second rails, the method comprising:
   folding a rope at any point along the rope to create a loop, a first rope leg, and a second rope leg;
   then bringing the loop under, up, and over the primary load bar;
   then bringing the loop between the first rope leg and the second rope leg;
   then bringing the loop under, up, and over the primary load bar again;
   then bringing the loop over the first rope leg and the second rope leg;
   then pulling a portion of the first rope leg and the second rope leg between the loop such that the ends of the first rope leg and the second rope leg hang under the loop; and
   inserting a shaft through a tunnel produced by pulling a portion of the first rope leg and the second rope leg between the loop.

7. The method of claim 6, further comprising untying steps comprising:
   removing the shaft from the tunnel; and
   pulling the first rope leg and the second rope leg to unwrap the loop from the primary load bar.

* * * * *